J. NICASTRI.
HOTBED.
APPLICATION FILED JUNE 13, 1916.
1,212,097.
Patented Jan. 9, 1917.
2 SHEETS—SHEET 1.
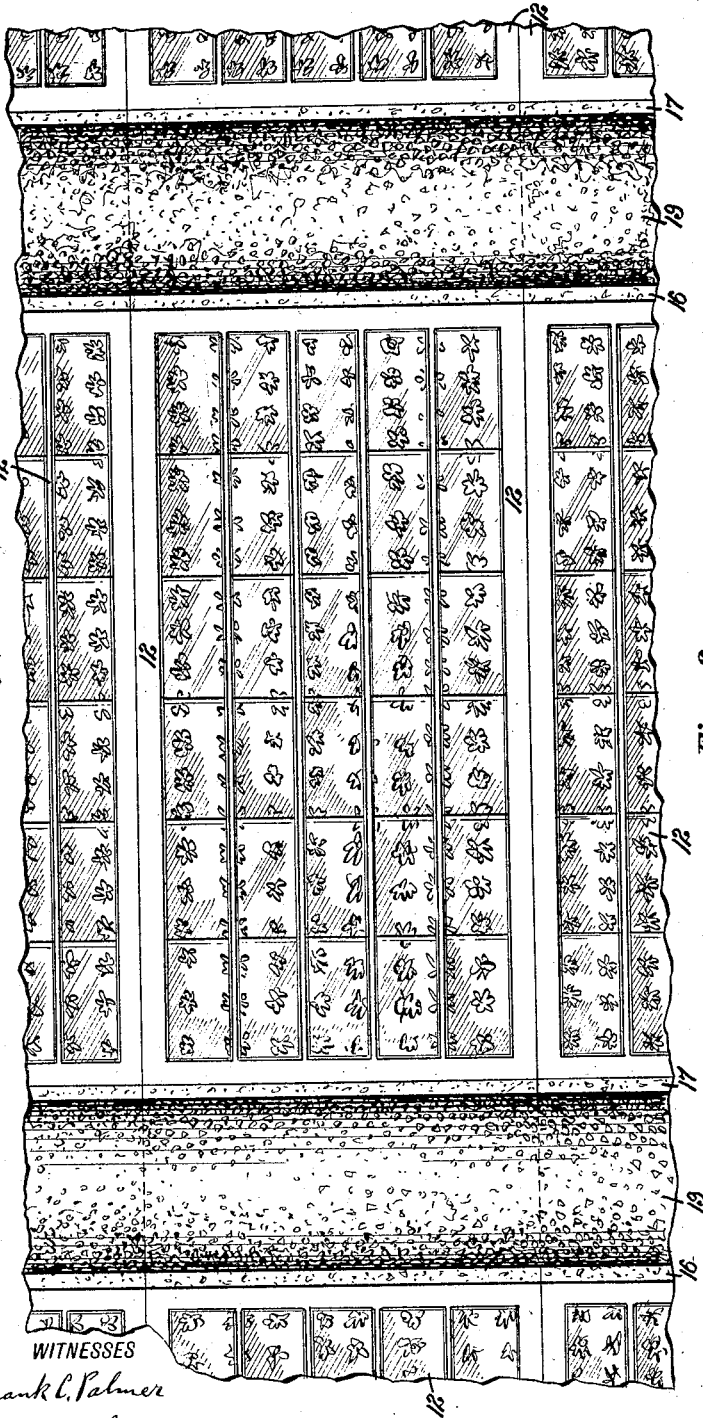
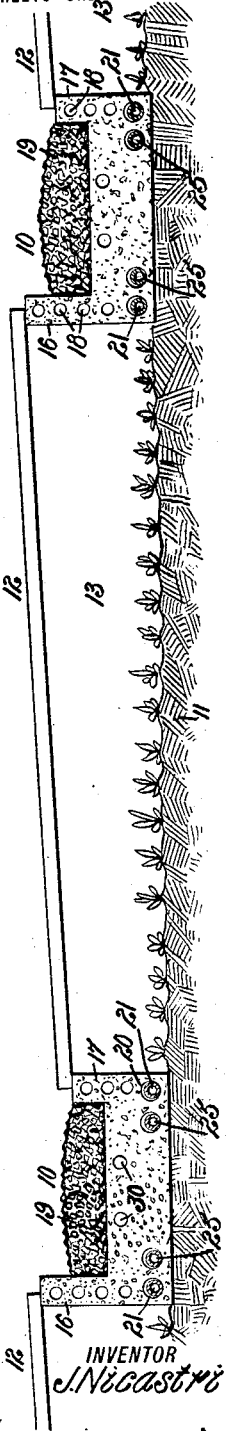
WITNESSES
Frank C. Palmer
INVENTOR
J. Nicastri
BY
ATTORNEYS

J. NICASTRI.
HOTBED.
APPLICATION FILED JUNE 13, 1916.

1,212,097.

Patented Jan. 9, 1917.
2 SHEETS—SHEET 2.

WITNESSES
Frank L. Palmer
[signature]

INVENTOR
Joseph Nicastri
BY [signature]
ATTORNEYS

UNITED STATES PATENT OFFICE.

JOSEPH NICASTRI, OF NEW YORK, N. Y.

HOTBED.

1,212,097.

Specification of Letters Patent.

Patented Jan. 9, 1917.

Application filed June 13, 1916. Serial No. 103,441.

*To all whom it may concern:*

Be it known that I, JOSEPH NICASTRI, a subject of the King of Italy, and a resident of the city of New York, North Beach, borough of Queens, in the county of Queens and State of New York, have invented new and useful Improvements in Hotbeds, of which the following is a full, clear, and exact description.

The object of the invention is to provide certain new and useful improvements in hotbeds whereby the beds can be readily set up of any desired length with a path between for the gardener to walk on for opening and closing the bed and attending to the plants therein.

Another object is to properly heat the hotbed to insure proper growth of the plants.

In order to accomplish the desired result, use is made of pairs of spaced concrete supports, each in the form of a rectangular frame having spaced sides raised above the ends, and a sash of a width corresponding to the length of a support, the ends of the sash resting on top of the opposite sides of the supports. Use is also made of steam supply pipes passing through passages formed in the sides of the support, the passages having openings leading to the face of the sides to allow the heat from the steam pipes to pass to the hotbed.

A practical embodiment of the invention is represented in the accompanying drawings forming a part of this specification, in which similar characters of reference indicate corresponding parts in all the views.

Figure 3:
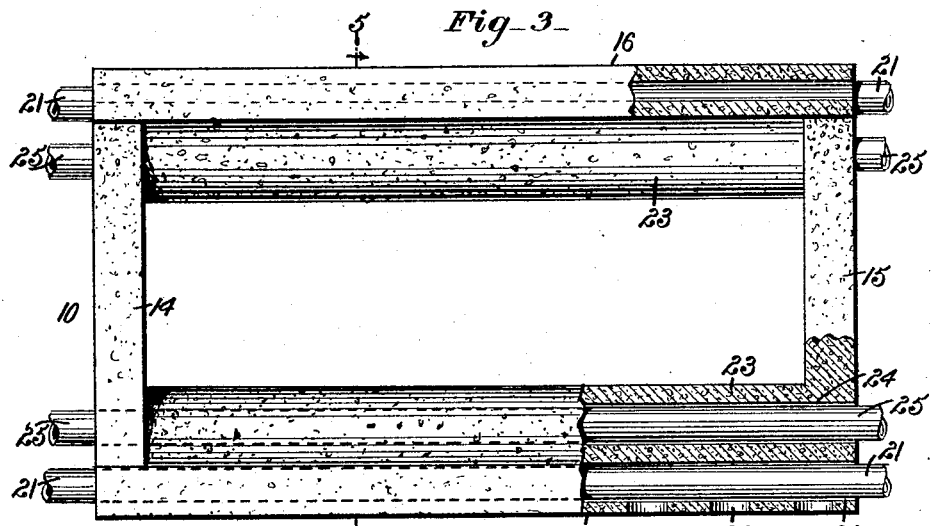
Figure 4:
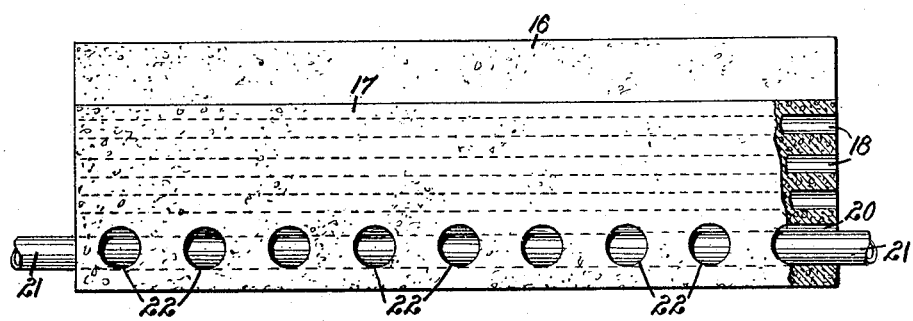
Figure 5:
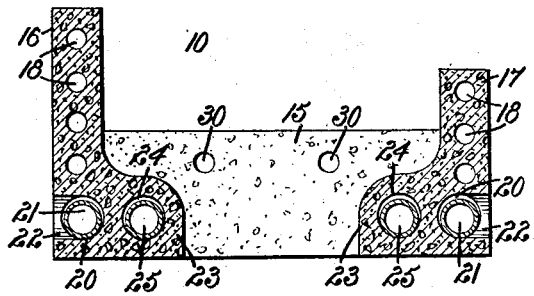

Figure 1 is a plan view of the hotbed; Fig. 2 is a side elevation of the same with the heating pipes shown in section; Fig. 3 is an enlarged plan view of one of the supports with parts broken out and the heating pipes extending through the same; Fig. 4 is a side elevation of the same with part broken out; and Fig. 5 is a cross section of the same on the line 5—5 of Fig. 3.

In order to build the hotbed use is made of a number of supports 10, preferably made of concrete, set on the ground 11 and arranged in pairs spaced proper distances apart to support a sash 12 of usual construction, the sash being of a width corresponding to the length of each support 10. By resting the ends of the sash 12 on a pair of spaced supports 10, a sufficient space 13 is had for the growth of the plants, as will be readily understood by reference to Fig. 2. Each of the supports 10 is in the form of a rectangular frame having ends 14 and 15 and sides 16 and 17 rising above the ends 14 and 15. The side 16 is somewhat higher than the sides 17 and is adapted to form a rest for the upper end of the sash 12, while the lower end of the sash rests on the lower side 17 of the complementary support 10 of the pair used for supporting a sash 12. The sides 16 and 17 are preferably provided with longitudinally extending air holes 18 to lighten the sides and to provide air spaces to prevent cold and moisture from passing into the hotbed.

By reference to Fig. 1, it will be noticed that the supports 10 are set end to end to support as many sashes 12 as desired, and the supports 10 are filled with cinders, ashes or like filling material 19 to about the level of the sides 17, thus providing a continuous path for the gardener to walk on while attending the hotbeds.

The sides 17 are provided near their bottoms with lengthwise extending passageways 20 through which extend steam pipes 21 connected with a suitable source of steam supply at one end of the series of hotbeds. Openings 22 lead from the outer faces of the sides 16 and 17 into the passages 20 to allow air to circulate through the said passages to be heated therein by the steam pipes and to pass into the hotbed to heat the same to the desired degree. The sides 16 and 17 are provided at their lower ends with inward extensions 23 having longitudinally extending passages 24 through which pass return pipes 25 for conducting water of condensation back to the boiler, it being understood that the terminals of the pipes 21 and 25 are connected with each other at the end of the row of supports 10. By reference to Figs. 2, 3, 4 and 5, it will be noticed that the passages 20 and 24 are somewhat larger than the pipes 21 and 25 so as to permit convenient insertion of the said pipes and to leave room for the circulation of air.

In setting up the hotbed it is only necessary to place the supports of a pair a distance apart for the sash 12 to rest on the top of the high side 16 of one support and on the low side 17 of the complementary support. Another pair of supports is then joined endwise to the pair already set on the ground and this operation is repeated and as many pairs of supports are joined as desired corresponding to the length of the hotbeds to be made. Adjacent supports 10 have their ends abutting and such abutting ends may be fastened together by the use of bolts passed through registering apertures 30 formed in the ends 14 and 15. The pipes 21 and 25 can be readily shoved into the passages 20 and 24. Throughout the series of connected supports, the pipes are joined at one end and connected at the other end with the boiler or the like.

The hotbed shown and described is very simple and durable in construction and can be cheaply manufactured and quickly set up without the use of skilled labor.

Having thus described my invention, I claim as new and desire to secure by Letters Patent:—

1. A hotbed provided with a concrete support in the form of a rectangular frame, the sides of which rise above the ends of the frame, the raised portions of the sides being spaced apart to provide space for a path on top of the support between the sides, the support having longitudinal passages in its sides and openings leading to said passages.

2. A hotbed provided with a concrete support in the form of a rectangular frame, the sides of which rise above the ends of the frame, the raised portions of the sides being spaced apart to provide space for a path on top of the support between the sides, the said support having passages extending from end to end through the sides, the sides having openings leading from the outer faces of the sides into the outermost passages.

3. A hotbed provided with a concrete support in the form of a rectangular frame, the sides of which rise above the ends of the frame, the raised portions of the sides being spaced apart to provide space for a path on top of the support between the sides, and a path filling of loose material filling the frame to a height a distance above the ends and approximately to the height of one of the sides, the sides of the support at their lower ends being provided with inward extensions.

4. A hotbed provided with a concrete support in the form of a rectangular frame, the sides of which rise above the ends of the frame, the raised portions of the sides being spaced apart to provide space for a path on top of the support between the sides, one of the sides being higher than the other side, the sides being provided at their bases with inward extensions and passages in the sides and extensions.

5. A hotbed, comprising a pair of spaced concrete supports, each in the form of a rectangular frame having spaced sides raised above the ends, and a sash of a width corresponding to the length of the supports, the ends of the sash resting on top of the opposite sides of the supports.

6. A hotbed, comprising a pair of parallel concrete supports spaced apart, each support having connected sides, of which one is higher than the other, and a sash of a width corresponding to the length of the supports, the sash extending between the pairs of supports and resting with its upper end on the high side of one support and its lower end on the low side of the other support.

7. A hotbed, comprising a pair of spaced concrete supports, each in the form of a rectangular frame having spaced sides raised above the ends, and a sash of a width corresponding to the length of the support, the ends of the sash resting on top of the opposite sides of the supports, each of the supports being provided with a pair of parallel passages extending lengthwise through each side and through the ends of the support, the passages of each pair being arranged one alongside the other and each side having openings leading from the face of a side to the corresponding outermost passage.

8. A hotbed, comprising a pair of spaced concrete supports, each in the form of a rectangular frame having spaced sides raised above the ends, a sash of a width corresponding to the length of the supports, the ends of the sash resting on top of the opposite sides of the supports, each end of the supports being provided with a pair of parallel passages extending lengthwise through each side and through the ends of the support, the passages of each pair being arranged one alongside the other and each side having openings leading from the face of a side to the corresponding outermost passage, a steam pipe extending through each outermost passage, and a return pipe for the water of condensation extending through each innermost passage.

9. A hotbed, comprising a pair of parallel concrete supports spaced apart and each having sides, of which one is higher than the other, a sash of a width corresponding to the length of the supports and resting with its upper end on the high side of one support and on the low side of the other support, a steam pipe extending lengthwise through each side of the support, and a return water pipe extending through each side of the support.

10. A hotbed provided with a concrete support in the form of a rectangular frame, the sides of which rise above the ends and one of the sides being higher than the other, the sides being provided at the bases with inwardly extending enlargements, a passage extending lengthwise through each side near the bottom thereof, each side having openings leading from the outer face of the side to the said passage, and a second passage extending lengthwise through the return extension of each side.

JOSEPH NICASTRI.

Copies of this patent may be obtained for five cents each, by addressing the "Commissioner of Patents, Washington, D. C."